May 23, 1950 T. G. AITCHESON 2,508,738
ADJUSTMENT MECHANISM FOR MICROSCOPES
Filed Oct. 18, 1946
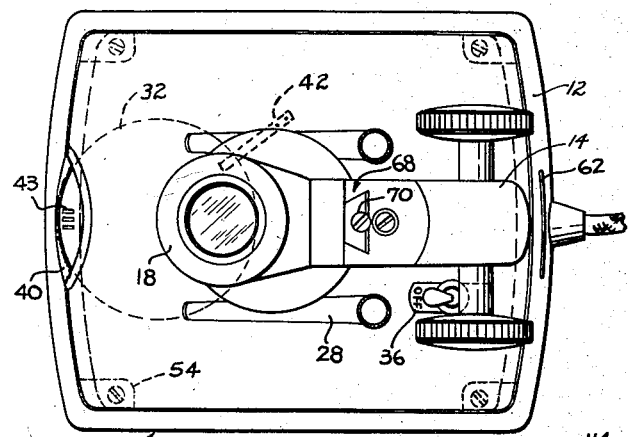
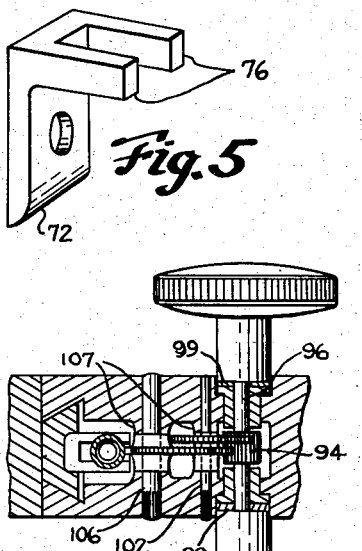
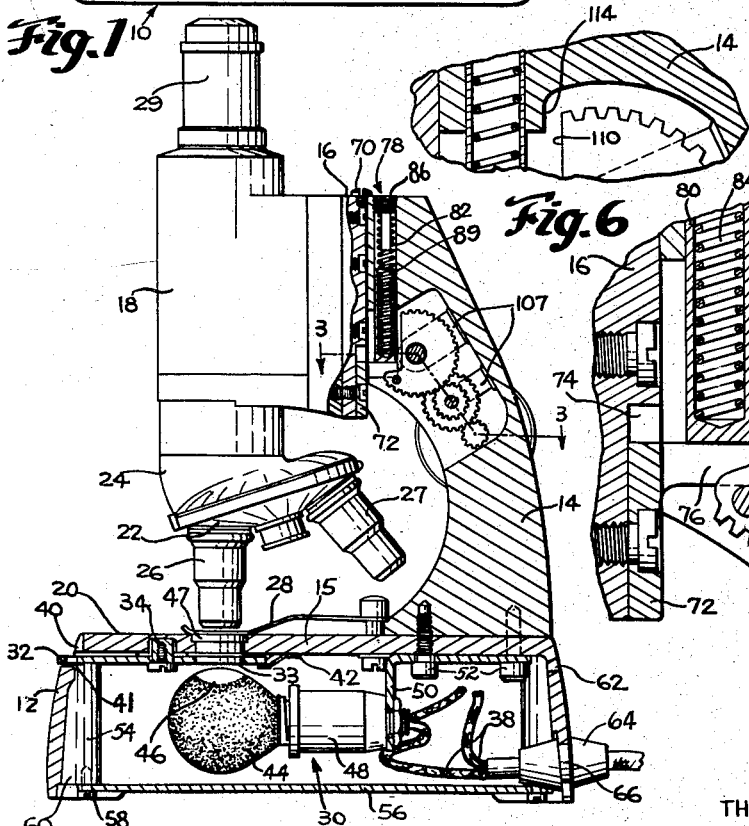
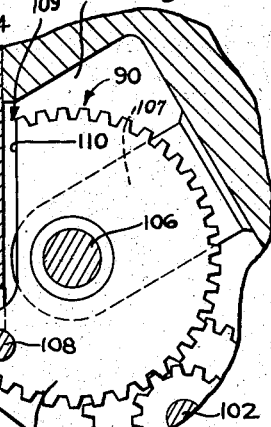
INVENTOR
THOMAS G. AITCHESON
BY
ATTORNEY Patented May 23, 1950

2,508,738

UNITED STATES PATENT OFFICE 2,508,738

ADJUSTMENT MECHANISM FOR MICROSCOPES

Thomas G. Aitcheson, Kenmore, N. Y., assignor to American Optical Company, Southbridge, Mass., a voluntary association of Massachusetts Application October 18, 1946, Serial No. 703,967

1 Claim. (Cl. 88—39)

The present invention relates to microscopes and more particularly to a microscope using various medium and low powers of magnification and provided with a single adjustment mechanism of suitable construction and arrangement to afford a smooth and accurate fine adjusting of the body tube associated therewith as well as a large range of travel, equivalent to that normally provided for coarse adjustment, while also being of a sturdy, efficient and economical construction.

A principal object of the invention is, accordingly, to provide a miscroscope of the class described having a single adjustment mechanism arranged to afford accurate fine adjusting of the microscope body tube for all positions thereof and to afford a large range of travel of said body tube. It is a further object of the invention to provide such an adjustment mechanism which is of an inexpensive, sturdy and compact construction and of a suitable and efficient arrangement for providing an easy and substantial uniform rate of movement of the miscroscope body tube throughout the entire range of its travel relative to the associated microscope stage. It is a further object of the invention to provide an adjustment mechanism which is positive when moving the body tube in one direction and yieldable when necessary when moving the body tube in the opposite direction for preventing injury to the parts should same accidentally strike an object on the stage. It is a further object of the invention to provide in such a microscope an adjustment mechanism enclosed within the supporting arm so that all parts thereof will be practically completely protected and concealed from view. These and other objects and advantages reside in certain novel features of construction, arrangement and combination of parts as will hereinafter be more fully set forth and pointed out in the appended claim.

Referring to the drawing:

Fig. 1 is a plan view of a microscope embodying the present invention;

Fig. 2 is a side elevational view of the microscope of Fig. 1 and showing parts thereof broken away to reveal details of the invention;

Fig. 3 is a sectional view taken substantially on line 3—3 of Fig. 2 and looking in the direction of the arrows;

Fig. 4 is an enlarged detailed showing of a portion of the mechanism of Fig. 2;

Fig. 5 is a perspective view of an element employed with the mechanism of Fig. 4; and Fig. 6 is a showing of a slight modification of the structure of Fig. 4.

Referring to the drawing in detail, numeral 10 indicates generally a microscope embodying a hollow base or housing 12 having a curved supporting arm 14 secured to its upper wall 15 and arranged so that the upper end thereof slideably supports a movable supporting member 16 which carries a microscope body tube 18 for vertical adjustment of the objective or objectives thereon, as the case may be, relative to the upper surface 20 of the hollow base 12, said surface serving as a stage of the microscope. In the present disclosure a pivotally mounted turret 22 is shown secured to the lower end or nose piece 24 of the body tube 18 and this turret is arranged to selectively support either an objective 26 or an objective 27 in alignment with the optical axis of the microscope so that an object or slide (not shown) may be positioned upon the surface 20 and held in place by spring clips 28 for observation through the eye piece 29 of the microscope. Obviously a turret for three or even four objectives could be used in place of turret 22 if desired.

A built-in light source is indicated generally at 30 and the amount of light being supplied thereby to illuminate the specimen on the slide on the stage or surface 20 may be controlled by a rotatable diaphragm 32 which has a plurality of different size openings formed thereon, one of which is indicated at 33. These openings may be selectively brought into axial alignment with the microscope body tube and objective and eye piece aligned therewith by pivotal movement of the diaphragm about pivot means 34 secured to the under side of said upper wall 15. A conventional snap switch 36 is provided in the electric circuit provided by leads 38 and is located on the upper wall 15 of the base near the rear thereof for controlling said light source.

A recess 40 (see Fig. 1) is formed in the upper front wall portion of the base 12 and a horizontal slot 41 extends inwardly therefrom and through the front wall of the housing to accommodate the peripheral edge portion of the diaphragm 32 so that the diaphragm may be conveniently moved by the finger of the operator of the microscope when changing from one diaphragm opening to another of different size. A suitable detent in the form of a leaf spring 42 may be secured to the lower surface of the upper wall 15 of base 12 and arranged to engage in any one of a plurality of suitably spaced grooves or like formations (not shown) in or on the lower surface of the diaphragm for properly centering and retaining each aperture of the diaphragm in place when adjusted into axially aligned position. Obviously other forms of diaphragm retaining means could be used in place of structure shown.

In order that the operator may readily determine which aperture is in alignment with the light source and microscope body tube, a series of numbers may be provided near the peripheral edge of the diaphragm, each being suitably positioned opposite its associated aperture, so that the numbers will be each separately exposed to view in the portion of the diaphragm extending through slot 41 when its respective aperture is in operative position. While various types of numbers may be used for the purpose, it has been found desirable to perforate the diaphragm 32 with small Roman numerals, such as indicated at 43, which extend through the diaphragm so that light from the interior of said housing may shine through the exposed numerals and be readily visible to the operator.

The light source 30, previously referred to, preferably comprises a tungsten filament bulb 44 having the major portion of its exposed surface silvered or coated to provide high light reflecting interior surface but has a circular portion 46 thereof left uncoated so that substantially all the light therefrom will be directed upwardly through the uncoated portion and the aligned aperture in the diaphragm and through a filter 47 cemented into a recess in the upper wall 15 of the base so that the light from bulb 44 will be filtered to provide nearly the equivalent of ordinary sunlight. The bulb 44 has screw threaded engagement with a socket 48 which is clamped in a conventional manner to a supporting bracket 50 and this bracket is in turn secured to the lower surface of the upper wall 15 by screws or the like 52 which also serve to secure supporting arm 14 to said base.

The base or housing 12 is preferably formed of a molded or cast construction and is provided at spaced locations in the interior thereof with integral projections 54 each of which terminate a short distance above the lower supporting surface of the base so that an enclosing plate 56 may be secured by screws or the like 58 to these projections and serve to nearly completely enclose the bottom of said housing. The plate 56 is of slightly smaller size than the size of the opening in the bottom of the base so that a free space 60 is formed for the entrance of air into the interior for cooling the light source, and for allowing the escape of the heated air a slot or the like 62 may be formed in the upper central portion of the rear wall of the base. A rubber bushing 64 is provided on the electrical leads 38 and so shaped that a central grooved portion 66 thereof will slide into and frictionally engage a slot formed in the lower central portion of the rear wall of said housing 12.

The vertically adjustable supporting member 16 carrying the microscope body tube is provided with suitable guide surfaces engaging complementary guide surfaces at 68 on the supporting arm 14. A stop means 70 is provided in the upper portion of member 16 and is arranged to engage the upper horizontal surface of the arm 14 for limiting the downward movement of the microscope body tube. A bracket 72 is secured by screws or the like in a recess 74 (see Fig. 4) in the lower portion of the supporting member 16 and has rearwardly extending laterally spaced fingers 76 formed thereon for providing abutments against which the lower end of a compression spring assembly 78 bears. This spring assembly is arranged to continuously urge the microscope body tube 18 in a downward direction. Spring assembly 78 includes a hollow tubular member 80 arranged to slide in a vertical bore 82 formed in arm 14 and the closed lower end of this tube 80 in engagement with spaced fingers 76 receives the lower end of compression spring 84 while the upper end of said spring is compressed by a plug 86 threaded into the threaded upper end of bore 82. Upward travel of said body tube is limited by engagement of the upper edge 89 of the tubular member 80 when it comes into engagement with plug 86.

The parts of the microscope are so constructed and arranged that stop member 70 engages arm 14 to limit the downward movement of the microscope body tube 18 when the objective in alignment with the body tube reaches a position a little above the upper surface or stage 20 of the microscope. An adjustment mechanism, generally indicated by the numeral 90, is provided for moving fingers 76 and thus the supporting member 16 and body tube 18 upwardly in opposition to the spring pressure afforded by spring assembly 78. This mechanism comprises a set of reduction gears positioned within a substantially concealed bay or recess 92 in the curved arm 14. The first of these gears is a pinion gear 94 mounted upon a shaft 96 (see Fig. 3) extending outwardly through bushings fitted into the arm 14. Shaft 96 has adjustably positioned in a conventional manner on its outer ends a pair of controlled knobs 98. Friction means such as spring washers 99 may be clamped by said knobs against said bushings to provide the desired amount of frictional resistance desired for said set of gears in opposing the downward pressure produced by spring 84 and the weight of the body tube and associated parts.

Gear 94 has meshing engagement with a larger gear 101 pivotally mounted on shaft 102 extending through the side walls of supporting arm 14. A smaller gear 103 is mounted on said shaft and arranged to rotate with gear 101. Gear 103 in turn actuates a larger driving gear 105 pivotally supported on shaft 106 likewise extending through the side walls of arm 14. In the assembly of the adjustment mechanism, shafts 102 and 106 are extended through the side walls and the associated gears and knurled end portions thereof are pressed into tight frictional engagement with one of the side wall portions of arm 14. The gears 101, 103 and 105 are retained in proper position upon their respective supporting shaft by inwardly projecting integral portions of the side walls of arm 14, as indicated by numeral 107, and it is only necessary to properly finish or machine these projections 107 where they are to be next to the gear hubs to provide the close accurate fit desired for receiving said gears, as will be readily apparent to one skilled in the art. Projections 107 also serve as strengthening ribs for the side walls of arm 14 adjacent the recess 92.

Shaft 106 is so positioned adjacent the free ends of fingers 76 that driving gear 105 may have a driving connection therewith formed by a pin 108 carried thereby and in engagement with the lower surfaces of these fingers so as to provide an upward pressure thereon for actuating the body tube 18. The pin 108 is at all times substantially in alignment with the downward force on finger 76 produced by compression spring 84 so as to avoid as much as possible eccentric loading of the slideable supporting member 16. In order that pin 108 may be so positioned, driving gear 105 is provided with a recess 109 and fingers 76 are spaced so that the part of the gear carrying pin 108 may be fitted therebetween and form a compact construction.

As pin 108 is moved upwardly in an arc from its lowest position shown in Fig. 4 to its highest position during adjustment of the microscope by knobs 98, it will have sliding engagement with the lower surfaces of fingers 76 and will travel approximately as far above the horizontal plane of shaft 106 as it is adapted to travel downwardly thereof. Consequently, a fairly uniform rate of vertical adjustment of the body tube 18 is provided thereby and this rate is substantially uniform in regions near the center of this arc. If desired, small rollers might be positioned upon pin 108 for reducing frictional engagement with fingers 76. However, in the construction shown such rollers have been omitted.

The length of the tube 80 is so proportioned relative to the associate structure that its upper edge 89 will engage plug 86 and serve as a positive stop or limiting means so that pin 108 cannot move upwardly and rearwardly sufficiently to cause it to swing from beneath fingers 76. Thus accidental disengagement of these parts is prevented. In order that a suitable stop means will be provided said adjustment mechanism when gear 105 is moving in the opposite direction, the edge 110 formed by the recess 109 in gear 105 is arranged so that it will swing into engagement with tubular member 80 and prevent further rotation of the gear train shortly after stop means 70 has come into action for limiting the downward travel of body tube 18. Since pin 108 has merely bearing engagement with each finger 76 a separable connection is formed therebetween. It will be clear that this construction provides an arrangement whereby the body tube and associated parts may be entirely freed from the driving gear, as the gears are being rotated to lower the body tube, in the event the objective, for example, should come into engagement with an object or the like on the microscope stage. In this manner injurious stress in the finely finished operating parts of the microscope are avoided and breaking of the object or slide by engagement by the objective is prevented.

In Fig. 6 is shown a slightly modified construction wherein an abutment 114 is provided integrally with the arm 14 for engagement with the forward edge 110 of the gear 105. Fig. 4 is preferred, however, primarily because of the economy involved in employing the adjacent surface of tube 80 as stop means for the gear 105 rather than forming the separate stationary portion 114 on the arm 14. Nevertheless, it should be understood that either arrangement may be employed satisfactorily.

From the foregoing it will be apparent that I am able to obtain the objects of the invention and provide a microscope having an improved and inexpensive adjustment mechanism arranged to operate conveniently and efficiently with a built-in light source and light control means. Various modifications can, of course, be made in the structure disclosed without departing from the spirit of the invention or the scope of the appended claim.

Copending application Serial No. 703,998, filed Oct. 18, 1946, in the name of J. J. Host, now Patent No. 2,503,389, dated April 11, 1950, describes and claims other subject matter disclosed in this application.

I claim:

In a microscope of the character described comprising a suporting arm having a recess formed therein and a body tube supporting member carried by said arm and arranged for rectilinear movement relative thereto for focusing upon an object positioned for inspection through said microscope, the combination of an abutment on said movable member having a pair of spaced fingers projecting into said recess, resilient means positioned in a bore in said arm and having an end portion urging said fingers and said movable member in a first direction, a manually operable adjustment mechanism carried by said arm and arranged to move said abutment and movable member in the opposite direction, said mechanism comprising reduction gearing including a relatively large driving gear pivotally mounted in said recess, said driving gear being positioned between said fingers and having its pivotal center located adjacent said abutment, said gear being rotatable through an angle of approximately ninety degrees during its normal range of adjustment for effecting coarse and fine adjustment of said body tube, a contacting pin carried by said driving gear and having its opposite end portions arranged to slidably engage substantially flat surface portions on said fingers so as to act in opposition to said resilient means, said flat surface portions being disposed generally normal to the path of movement of said abutment, a segmental recess in said driving gear for accommodating adjacent portions of said resilient means, said contacting pin being so radially spaced from the pivotal center of said gear that said gear when rotated through said angle will cause said abutment, movable member and body tube to travel through substantially said normal range, said contacting pin and flat surface portions on said fingers being disengageable for allowing free movement of said pin away from said fingers when said gear is actuated to move said body tube in said first direction and when external means or the like prevents such movement of said body tube.

THOMAS G. AITCHESON.

REFERENCES CITED

The following references are of record in the file of this patent:

UNITED STATES PATENTS

| Number | Name | Date |
| --- | --- | --- |
| 949,749 | Bausch et al. | Feb. 22, 1910 |
| 1,106,956 | Meyer | Aug. 11, 1914 |
| 1,223,198 | Ott | Apr. 17, 1917 |
| 2,057,187 | Gallasch | Oct. 13, 1938 |
| 2,135,870 | Fassin | Nov. 8, 1938 |